G. W. N. YOST.
Mowing-Machines.
No. 137,817. Patented April 15, 1873.
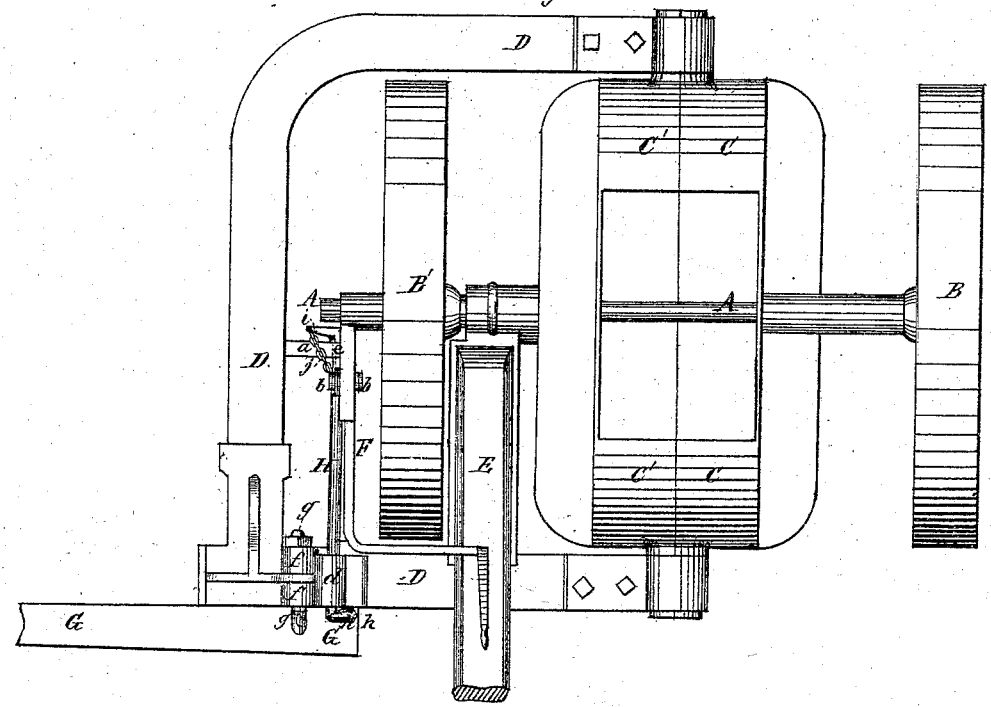
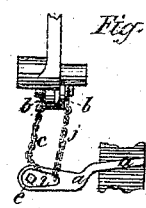
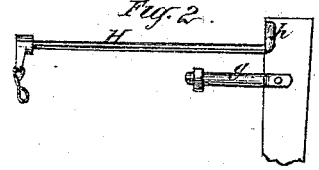
Witnesses:
John Mathys.
John F. C. Preinkert
Inventor:
George W. N. Yost.
By James Densmore,
Agent.

UNITED STATES PATENT OFFICE.

GEORGE W. N. YOST, OF CORRY, PENNSYLVANIA, ASSIGNOR TO "ACME MOWER AND REAPER COMPANY," OF NEW YORK, N. Y.

IMPROVEMENT IN MOWING-MACHINES.

Specification forming part of Letters Patent No. 137,817, dated April 15, 1873; application filed September 16, 1872.

CASE B.

*To all whom it may concern:*

Be it known that I, GEORGE W. N. YOST, of Corry, Pennsylvania, have invented an Improved Finger-Bar Lever for Mowing-Machines, of which the following is a specification:

The accompanying drawing and the following description thereof fully illustrate the invention, and of which drawing—

Figure 1 represents a view of the driving-wheels, inclosing-box, main frame, draft-tongue, and lifting-lever, on the main axle of a mowing-machine, and of a connecting-frame, with a finger-bar hinged thereto, surrounding a driving-wheel and attached to the main frame, and of a finger-bar lever attached to the connecting-frame and lifting-lever, and laid on the finger-bar. Fig. 2 represents a view of the finger-bar and finger-bar lever detached; and Fig. 3 represents a view from behind of the lifting-lever, finger-bar lever, and part of the connecting-frame, detached.

A represents a main axle of a mowing-machine. B represents a left-side driving-wheel on the main axle A. B′ represents a right-side driving-wheel on the main axle A. C represents a left-side hollow metal casing-plate loosely on the main axle A, between the driving-wheels B B′. C′ represents a right-side hollow metal casing-plate loosely on the main axle A, between the driving-wheels B B′. Uniting the hollow casing-plates C C′ with their open sides together, makes at once a main frame and a box to inclose and protect the gear-wheels. D represents a connecting-frame surrounding a driving-wheel, B′, and attached to each end of the main frame C C′. E represents a draft-tongue loosely on the main axle A, between the main frame C C′ and a driving-wheel, B′. F represents a lifting-lever hinged on the end of the main axle A, on the outer side of a driving-wheel, B′. G represents a finger-bar hinged to the connecting-frame D, on the outer side of a driving-wheel, B′. *a* represents an arm attached to the outer part of the connecting-frame D, and projecting horizontally toward the contiguous driving-wheel B′, in a line parallel with the main axle A. *b* represents an arm of the lifting-lever F, projecting downward from the hinge thereof at an angle of less than ninety degrees. *c* represents a chain or links attached to the inner end of the arm *a* of the connecting-frame D, and to the inner side of the arm *b* of the lifting-lever F. By this combination of the lifting-lever F with the main axle A and connecting-frame D, moving the lifting-lever backward and forward over the main axle will raise and lower the outer side of the connecting-frame, and also will raise and lower the inner end of the finger-bar G attached to the connecting-frame. *d* represents a journal-bearing on that part of the connecting-frame D which is next to and parallel with the finger-bar G. *e* represents another journal-bearing in line with the first journal-bearing *d*, and in the horizontal arm *a* of the connecting-frame D. *f* represents another journal-bearing attached to the connecting-frame D, out beyond and alongside of and parallel with the first journal-bearing *d*. *g* represents a journal-arm attached to the finger-bar G near the inner end, at a right angle to the line of the finger-bar and loosely within the outer journal-bearing *f* of the connecting-frame D. This combination of the finger-bar G with the connecting-frame D by the journal-arm *g* and journal-bearing *f* hinges the finger-bar to the connecting-frame, and allows the outer end of the finger-bar to vibrate up and down, and the attachment of the connecting-frame D to the main frame C C′, either by hinges or elastic springs, allows the outer part of the connecting-frame and the inner end of the finger-bar G attached thereto to vibrate up and down, and these vibrations of the finger-bar G are independent of each other. H represents a rocking rod, nearly horizontal, and parallel with the draft-tongue E, and loosely in the journal-bearings *d e* of the connecting-frame D. *h* represents a horizontal arm, attached to, or a bent end of, the rocking rod H, at a right angle to the line of the rod, and laid loosely on the top of the inner end of the finger-bar G, beyond the journal-bearing *d* of the connecting-frame D, and between the hinge *g* of the finger-bar and the main frame C C′. *i* represents another arm or bent end of the rocking rod H, at a right angle to the line of the rocking rod at or near the end opposite to the finger-bar, and at an angle outward and opposed to the inner angle of the first arm $h$. By the combination of the rocking rod H with the finger-bar G by the first arm $h$ of the rocking rod and the journal-bearings $d$ $e$ of the connecting-frame D, the rocking rod becomes a finger-bar lever. $j$ represents another chain or links attached to the second arm $i$ of the finger-bar lever H, and to the outer side of the arm $b$ of the lifting-lever F, and a little shorter than the first chain $c$. By having the chains $c$ $j$ long enough the outer end of the finger-bar H, when in ordinary working position, will fall any distance desired below a horizontal line, and there is nothing to prevent its rising any required distance above such line, so the finger-bar is free to adapt itself to any inclination of the ground. By moving the lifting-lever backward over the main axle A, in raising the outer part of the connecting-frame D, and the inner end of the finger-bar G attached thereto, the second chain $j$ will be drawn upward, and will pull the second arm $i$ of the finger-bar lever H upward and inward toward the contiguous driving-wheel B', which will roll or rock the finger-bar lever H inward, which will thrust the first arm $h$ of the finger-bar lever downward, and thrust down the inner end of the finger-bar G with it, and thereby throw up the outer end of the finger-bar. Thus the outer end of the finger-bar G, as well as the inner end thereof, can be raised or lowered within the control of the operator by a backward or forward movement of the lifting-lever F.

The following is a summary of the invention:

I claim—

The arrangement of a finger-bar lever, hinged horizontally on the connecting-frame, on the outer side of and rocked at a right angle to the rolling direction of a main driving-wheel, laid on the inner end of the finger-bar, between the finger-bar hinge and the main frame, and worked by a lifting-lever on the outer end of the main axle of a mowing-machine, substantially as described.

G. W. N. YOST.

Witnesses:
  CHAS. BIRD,
  JAMES DENSMORE.